(12) United States Patent
Huster

(10) Patent No.: US 9,565,058 B2
(45) Date of Patent: Feb. 7, 2017

(54) METHOD OF CONNECTING A DEVICE TO A NETWORK, A DEVICE CONNECTING SYSTEM, AND A PROGRAM

(71) Applicant: Canon Europa N.V., Amstelveen (NE)

(72) Inventor: Karsten Huster, Lienen (DE)

(73) Assignee: Canon Europa N.V., Amstelveen (NL)

( * ) Notice: Subject to any disclaimer, the term of this patent is extended or adjusted under 35 U.S.C. 154(b) by 151 days.

(21) Appl. No.: 14/349,492

(22) PCT Filed: Oct. 4, 2012

(86) PCT No.: PCT/EP2012/004147
§ 371 (c)(1),
(2) Date: Apr. 3, 2014

(87) PCT Pub. No.: WO2013/050145
PCT Pub. Date: Apr. 11, 2013

(65) Prior Publication Data
US 2014/0372580 A1   Dec. 18, 2014

(30) Foreign Application Priority Data

Oct. 4, 2011 (GB) .................................. 1117030.5

(51) Int. Cl.
| | | |
|---|---|---|
| *G06F 15/177* | (2006.01) | |
| *H04L 12/24* | (2006.01) | |
| *H04L 29/08* | (2006.01) | |
| *H04L 29/12* | (2006.01) | |

(52) U.S. Cl.
CPC ........... *H04L 41/0806* (2013.01); *H04L 67/16* (2013.01); *H04L 61/1511* (2013.01); *H04L 61/2038* (2013.01); *H04L 61/2092* (2013.01); *H04L 67/08* (2013.01)

(58) Field of Classification Search
CPC ....... H04L 67/16; H04L 67/08; H04L 41/0806
USPC ................ 709/203, 217, 219, 245, 220, 222
See application file for complete search history.

(56) References Cited

U.S. PATENT DOCUMENTS

| | | | |
|---|---|---|---|
| 7,596,484 B1 * | 9/2009 | Patel ....................... | H04L 43/50 |
| | | | 702/182 |
| 7,603,266 B2 * | 10/2009 | Ramanathan ....... | G06F 9/45537 |
| | | | 370/245 |
| 2006/0235997 A1 * | 10/2006 | Munirajan ........ | H04L 29/12264 |
| | | | 709/245 |
| 2007/0225957 A1 | 9/2007 | Ogura | |

FOREIGN PATENT DOCUMENTS

CN         1571367 A        1/2005

OTHER PUBLICATIONS

Wikipedia, "Multicast DNS", Sep. 18, 2011.*
(Continued)

*Primary Examiner* — Frantz Jean
(74) *Attorney, Agent, or Firm* — Canon U.S.A., Inc. IP Division

(57) ABSTRACT

The present subject matter is generally related to a method of connecting a device to a network, a device connecting system and a device connecting program. A network device or a device responding on a device service discovery request within a network with information of a virtual service on the device, which may be different from the actual capabilities and functions of the device.

13 Claims, 6 Drawing Sheets

(56) References Cited

OTHER PUBLICATIONS

Hinden et al., "RFC 4291", Feb. 2006.*
Jeremie Albert et al. "UbiPAN: A Bluetooth Extended Personal Area Network." 4th International Conference on Complex, Intelligent and Software Intensive Systems (CISIS—2010). Feb. 15-18, 2010, Krakow, Poland. IEEE, Piscataway, NJ, USA: IEEE Computer Society, Feb. 15, 2010. 774-778.
Guttman, Erik. "Service Location Protocol: Automatic Discovery of IP Network Services." IEEE Internet Computing 3.4 (1999): 71-80.

* cited by examiner

METHOD OF CONNECTING A DEVICE TO A NETWORK, A DEVICE CONNECTING SYSTEM, AND A PROGRAM

BACKGROUND OF THE INVENTION

The present subject matter is generally related to a method of connecting a device to a network, a device connecting system and a device connecting program.

Present computer networks are very complex and a large numbers of devices are connected and disconnected within different networks. Also networks are connected and/or disconnected with each other and every connected network device within the network must be addressed in a unique way. Especially IP-addresses are used in different IP-networks to address a device. Additionally after the device is addressed within the network, information about the available services of the device are shared within the network. For example, in case the device is a printer the information about the device services might be the printer capabilities, such as colour printing functions, status of the printer consumables or number of print jobs in the print queue of the printer, and may be shared within the network. A client terminal connected with the network and designating the printer is able to print a document on the printer and may get status information about the print job, based on the information about the services on the printer.

For example, WO201185018A1 discloses a portable computing device, which can be connected to multiple accessories concurrently in a daisy chain topology. At least one intermediary accessory provides one port for connection to the device and another port for connection to another accessory. Each accessory may communicate with a different communication protocol via the intermediated accessories with the device.

However, a disadvantage of these known arrangements is that the device connected to a network sends on a device service request always information about the actual services of the device. According to the known system setups, a simulation of a device within a network is very complicated, because after the response of the actual services of the device, the device is providing additional information to reconfigure the device information within the network. This procedure may be very time-consuming for an IT-administrator and may cause a number of error messages within the network.

SUMMARY OF THE INVENTION

According to a first aspect of the present subject matter there is provided a system for connecting a device to a computer network. The device may be a laptop, tablet-PC, multifunctional printer, scanner, server, router, medical device or any electronic device, which could be connected to a computer network. The network has at least one network device, which may be any electronic device within a computer network, and at least one of the network devices and the device having device detection and device service detection functionalities. The system comprises means for addressing the device within the network, means for naming the device within the network based on the addressing of the device within the network and means for discovering services on the device.

According to the present disclosure the term service comprises a hardware-based and/or software-based functionality, capability, process, application and/or receiving or delivering of contents, data and/or files of at least one of the devices and/or network devices.

Additionally, the system comprising means for analysing the service discovery request and responding information about at least one virtual service instead of information about at least one of the actual services on the device.

According to the present disclosure the term virtual service comprises a hardware-based and/or software-based functionality, capability, process, application and/or receiving or delivering of contents, data and/or files, which may be emulated or simulated on at least one of the devices or in combination on different devices and/or on related network devices.

The present disclosure has the advantage that the automatic response of a device, which is connected to a network, may be changed by providing information about a virtual service of the device, which may be different compared to the information of at least one of the actual services of the device. The teachings of the present disclosure allow the emulating or simulating of different connected devices to a network. For example, a server may respond on a device service discovery request within a network with information of services of a printer and may simulate a printing process within the network without printing capabilities. Therefore the present subject matter discloses the possibility to set up very complex networks with devices and network devices, simulating complex network processes based on information of the virtual services of the devices. The advantage of the present subject matter is that complex networks with different devices may be simulated in advance by computers providing information of virtual services of virtual devices, which may not be tested so far within the network. Also the response of a device providing information of virtual services of another device may be changed manually by an IT-administrator for testing or processing purposes.

In another embodiment of the present disclosure at least two network devices within the network share the responding information about the virtual service of the device. In this case, the information of the virtual service of the device is shared within the network between all network devices. After the integration of the device with the information of the virtual service the network devices have access to the virtual service on the device.

In a further embodiment at least one of the functionalities on the network device is linked to the virtual service on the device. Especially if complex or expensive devices are not yet integrated within a network, the network devices may access to the virtual service and linked processes on the network devices may be monitored within a simulated network. Additionally, very often processes and applications on the network device are linked to applications on other devices within a network. For example, if a printer is detected within a network, the information about the detected printer is used on network devices, such as mobile phones, for displaying available printers within a network. The printer may be selected on the mobile device for printing a document and the related print job is routed to the printer. In case the device is a server and providing information about a virtual print service on the server, the server may be displayed within the mobile device as an available printer and the print job may be routed within a virtual print queue on the server. After this process the print job may be transformed by further applications on the device. According to this network setup there is no need for further applications or for changes of the existing operating system of the network device, if the existing infrastructure and linked information system is used. In the above mentioned case, that detected printers are listed in a certain printer list of the mobile device. Because of that, there is no need for further applications on the network device to display the detected server with the information of virtual services of a printer.

In a further aspect of the subject matter the virtual service of the device is a predefined service, which may be emulated or simulated on the device and/or by the device, and the information of the virtual service is stored on the device.

Additionally, the means for addressing the device within the network is a Dynamic Host Configuration Protocol (DHCP) server, which provides a unique IP-address to the device. According to this embodiment at least one server is needed for negotiating the addressing of the device within a network. In a further embodiment the means for naming the device within the network is a Domain Name System (DNS) server, which provides DNS-format queries for the device.

Alternatively, the means for addressing the device within the local network is a link-local addressing, conducted on the device by interacting with multiple network devices within the network. According to this embodiment there is no need for a server, which organises the addressing of the device within the network. Additionally, the means for naming the device within the network is a Multicast DNS (mDNS), conducted on the device by interacting with multiple network devices within the network. In a further embodiment, the means for analysing the device service discovery request analyses the mDNS query for the name of the device, conducted on the device. Also, the mDNS query for the name of the device indicates the service and/or the virtual service of the device.

For example, if a Canon PIXMA MG8250 inkjet printer is connected to a network, the means for naming test if the default name Canon-PIXMA_MG8250 is already used within the network. If the name is not used already, the name is used as a unique name for the printer. Based on the name of the device the network may be determining the possible services. In view of the above example, based on the detected name of the Canon PIXMA MG8250, the printer capabilities, such as duplex colour printing, as information of the virtual services may be shared between and/or displayed and/or selected by the network devices.

According to a further aspect of the disclosure, the communication transport protocol between the device and at least one of the network devices is the Hypertext Transfer Protocol (HTTP) connection or the User Datagram Protocol (UDP). Also, the application protocol contains the Internet Printing Protocol (IPP) or the Line Printer Remote (LPR), in case the information about the virtual service of the device indicates a printer service.

In a further embodiment a method for connecting a device to a network is disclosed and the network having at least one network device, and at least one of the network device and the device having device detection and device service detection functionalities. After addressing the device within the network, the device is named within the network based on the addressing of the device within the network. After discovering services on the device, the device service discovery request is analysed and responding information about at least one virtual service instead of information about at least one of the actual services on the device.

In accordance with one aspect of the present subject matter the foregoing and the other objects are achieved by a program and/or a storage medium for connecting a device within the network.

BRIEF DESCRIPTION OF THE DRAWINGS

An embodiment of the present invention subject matter will now be described, by way of example only, with reference to the accompanying drawings in which.

DETAILED DESCRIPTION

Figure 1:
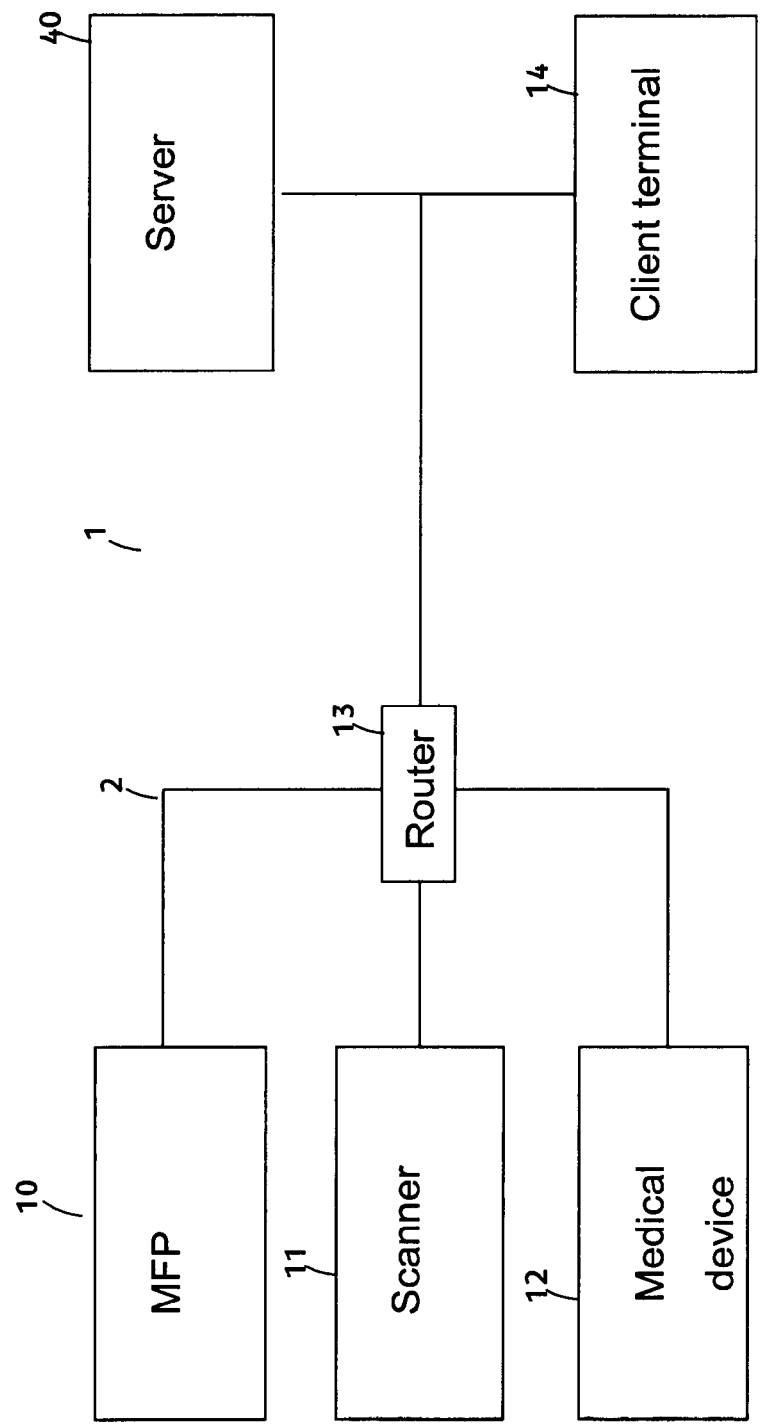
FIG. 1 is a schematic diagram showing three devices and two network devices within a network.

FIG. 1 shows a system 1 comprising a network 2 with three devices, a multifunctional printer (MFP) 10, a scanner 11 and a medical device 12. Already part of the network 2 are a router 13, a server 40 and a client terminal 14 as network devices.

Figure 2:
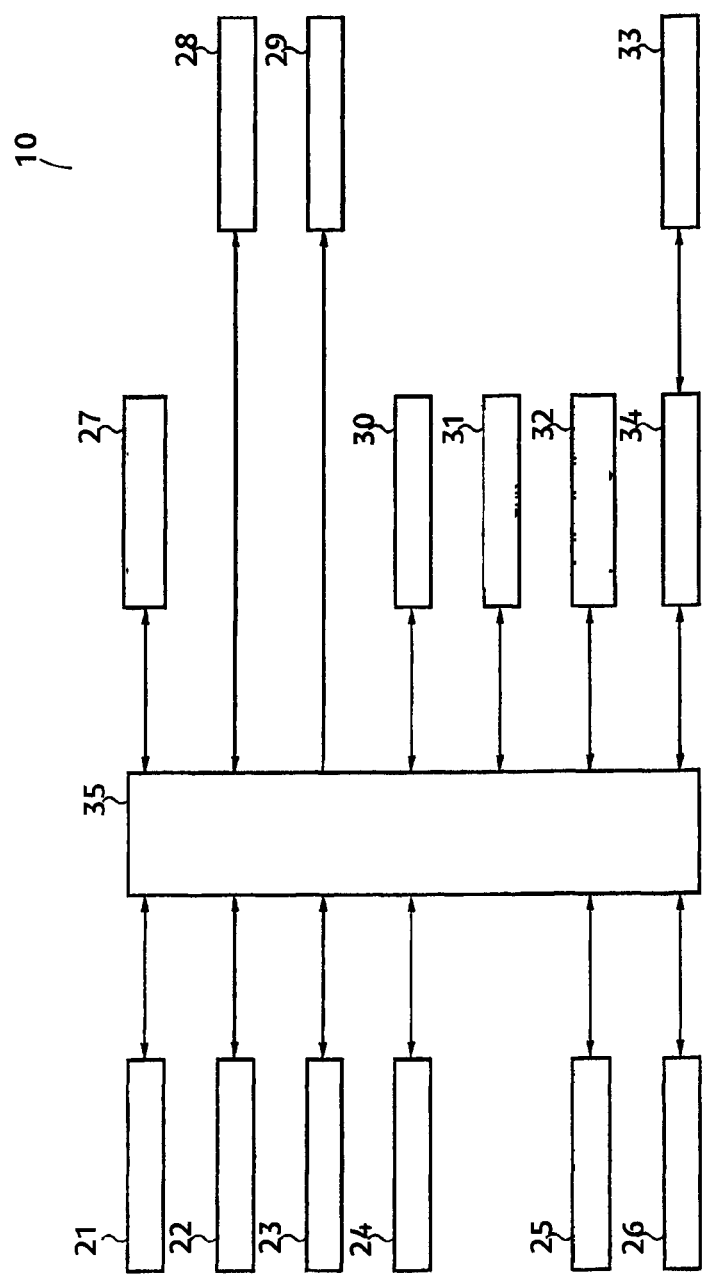
FIG. 2 shows the main features of a multifunctional printer (MFP) as a network device.

FIG. 2 shows the hardware configuration of the printer 10, especially a multifunctional device, with printing, scanning and communication capabilities. The printer 10 comprises a CPU 21, a ROM 22, a hard disk drive 23, and a RAM 24. These components are standard hardware components for computers and other devices and perform their usual functions. The printer 10 further comprises a display unit 25, an operation unit 26, a communication control unit 27, an image reader 28, a recording unit 29, an image memory 30, an image processing unit 31, an authentication unit 32, a card reader 33 and an I/O control unit 34. The display unit 25 is a touch-screen LCD display provided on the printer 10 to allow a user to make selections and view information on the printer 10. The operation unit 26 is a keypad and other buttons to allow the user to enter settings and other information to the printer 10. The communication control unit 27 is provided to allow the printer 10 to communicate over a network, such as LAN, with a print server. The printer 10 may be also a scanner that allows scanning of documents. The recording unit 29, shown in FIG. 2, represents parts of the printer 10, dedicated to printing. The recording unit 29 functions to print image data onto a recording medium and output the recording medium for collection by a user. The image memory 30 is a memory provided for storage of image data during scanning by the image reader 28 or printing by the recording unit 29. The image-processing unit 31 represents various application specific integrated circuits (ASIC) provided in the printer 10 in order to increase the speed of certain image processing operations, such as conversion of scanned R,G,B data into C,M,Y,K data during a copying operation. The authentication processing unit 32 is provided in order to authenticate user details received from the card reader 33. Data from the card reader 33 is received at the authentication processing unit 32 via the I/O control unit 34. The authentication processing unit 32 may be implemented by software run using the CPU 21 and RAM 24 rather than as a separate hardware component. The components 21 to 34 described above are interconnected via a system bus 35.

The printer 10 runs an operating system. In this particular embodiment the operating system is the Multifunctional Embedded Application Platform (MEAP) operating system provided on multifunctional device devices sold by Canon®. The operating system allows the running of JAVA programming applications and also includes a web interface. The operation system also allows the display of the device status and/or the display of the energy consumption of a selected print job.

Figure 3:
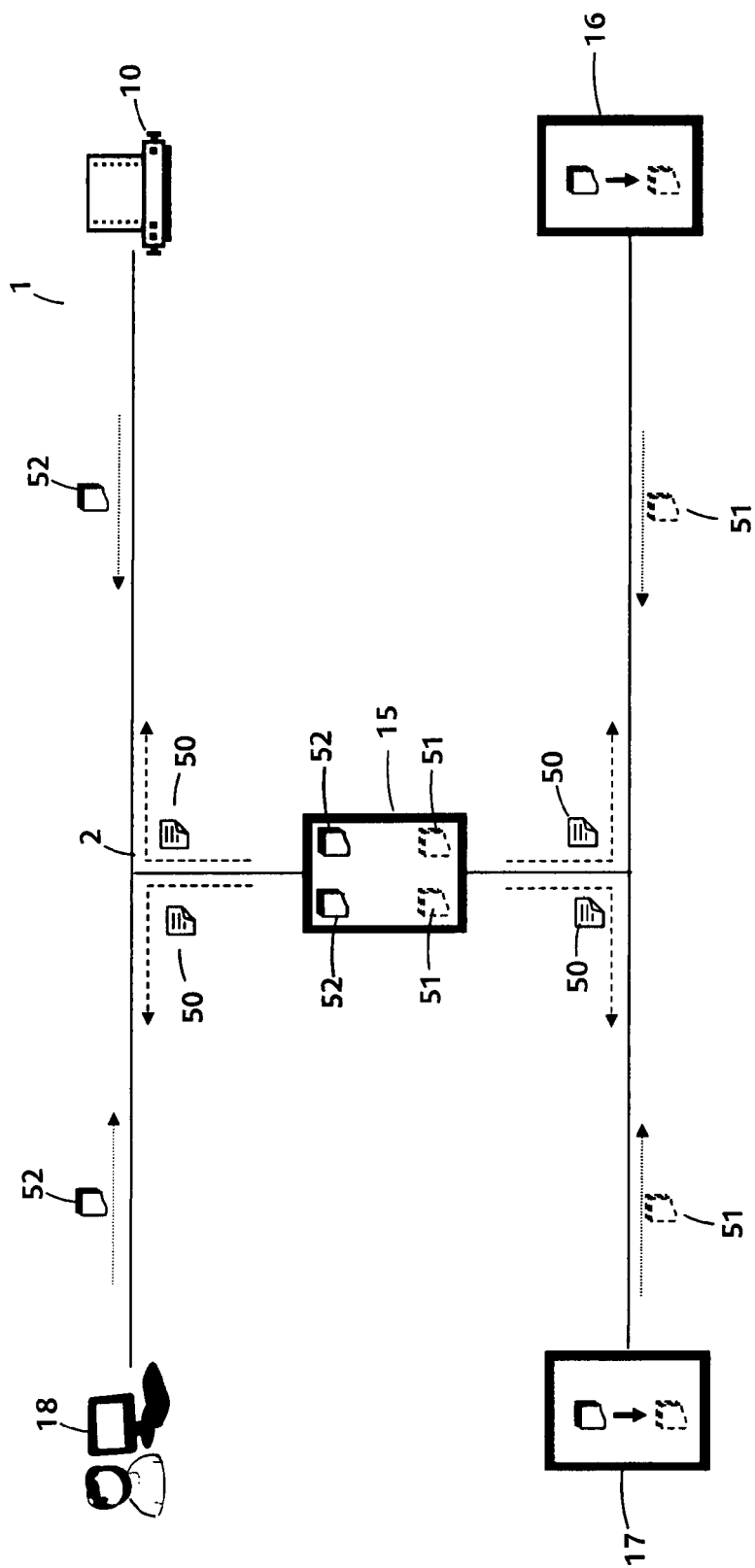
FIG. 3 is a chart showing the routing of the information of services and virtual services within the network and the device is addressed by a central server.

FIG. 3 is a chart about network 2, with a central server 15 addressing the network devices 10,18 and two servers as connectable devices 16, 17. The server 15, especially a Dynamic Host configuration Protocol (DHCP) server, organises the addressing of the network devices 10,18 and the devices 16,17. According to the embodiment of FIG. 3, based on the device detection request 50 of the DHCP-server, the network devices 10,18 and the devices 16,17 may get a unique address within the network 2. Additionally, the server 15 may be a Domain Name System (DNS) server, and linking the network addresses with a unique name for every network device 10,18 and every device 16,17. Also the network devices 10,18 response their already in the system 1 known information about the services 52 on the network devices 10,18 to the network 2, whereas the information is already stored on the central server 15.

Additionally the devices 16,17 are addressed and named by the central serve 15 within the network 2. However, responding on the device service discovery request of the server 15, the devices 16,17 detect the device service discovery request and process an internal workflow for providing information of a virtual service 51, which need not to be an actual software-based and/or hardware-based service of the devices 16,17. The virtual services may be emulated or simulated on the devices 16,17. For example, printer functions may be simulated on the devices 16,17. Also information about other virtual services may be provided by the same device 16,17, such as information about virtual services of a medical device. In this case, the device 16,17 may provide different information of virtual services for different devices, such as printer and medical device services. According to this network setup, every virtual device may be addressed and named by the server 15 separately.

Figure 4:
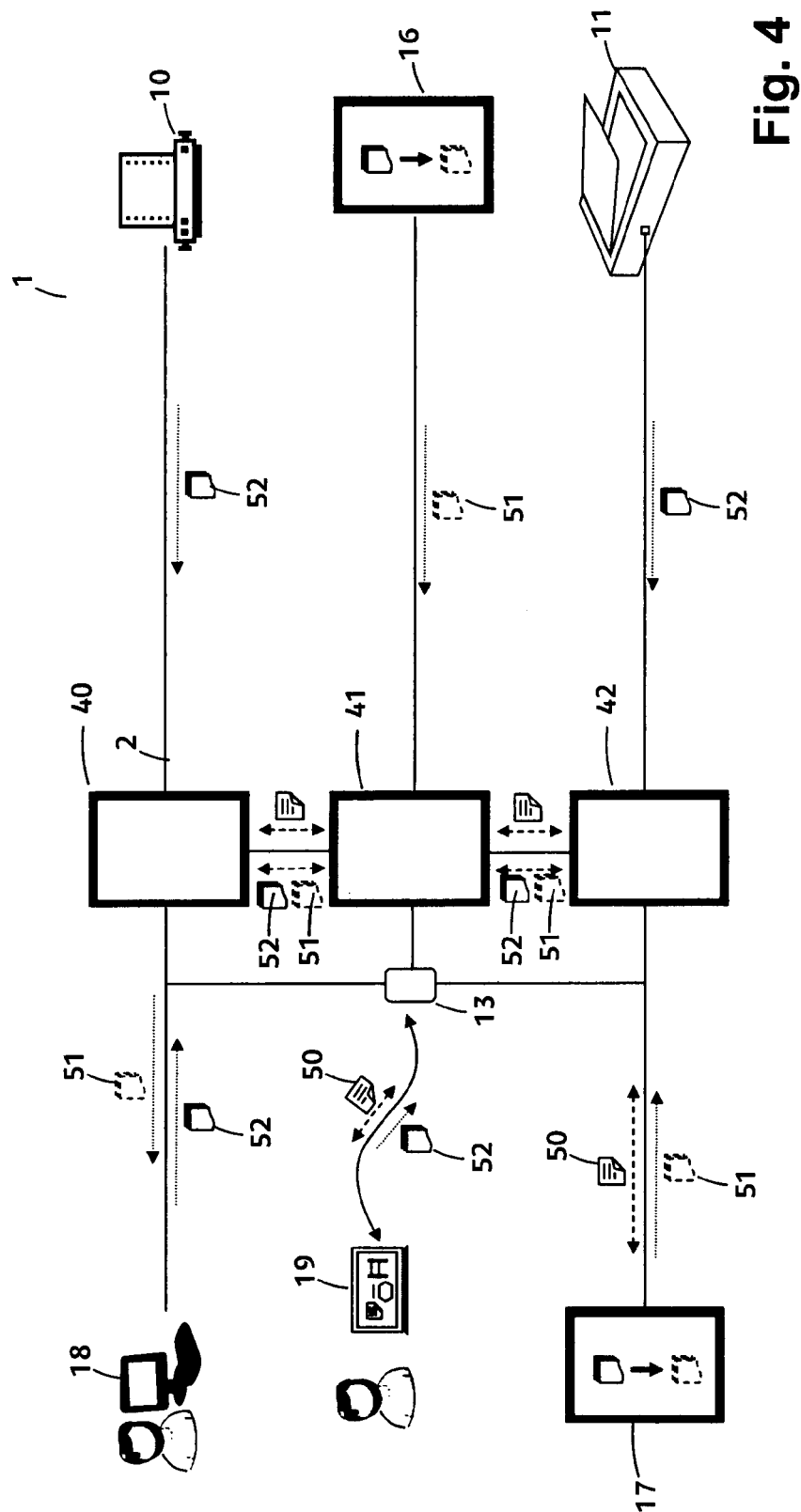
FIG. 4 is a chart showing the routing of the information of services and virtual services within the network and the device negotiates the address locally in coordination with the network devices and the devices.

FIG. 4 discloses a further embodiment of the system 1 for connecting a device to a network 2. According to FIG. 4 a printer 20, a scanner 11, a server 16, a computer 18 in combination with communication servers 40,41,42 define the network devices within the network 2. In contrast of the embodiment of FIG. 3 according to the embodiment of FIG. 4 the addressing and naming is organised by the network devices 10,11,13,16,18,40,41,42 itself. For example, the Bonjour service of Apple Inc. may be used by providing a so-called zero-configuration IP networking. According to this system setup, the addressing and naming is negotiated by every network device 10,11,13,16,18,40,41,42 and device 17,18 itself in coordination with the other network devices 10,11,13,16,18,40,41,42 and devices 17,18 within the network 2. The addressing within the network 2 may be a self-assigned link-local addressing. Additionally the naming within the network 2 may be solved by using mDNS queries for generating unique device names within the network 2. It would be appreciated if the syntax of the name also disclose information of the service and/or virtual service of the device 18,19.

According to the embodiment of FIG. 4, one network device 16 within the network 2 already provides information about at least one virtual service on these network devices 16. Additionally, at least one of the devices 17 negotiate with the network devices 10,11,13,16,18,40,41,42 the address and name for this additional server 17. According to the embodiment of FIG. 4 the server 17 respond on the device service discovery request with information about a virtual service 51 on the server 17. Also a mobile device 19 is connected via the router 13 to the network 2 and negotiate the address and name in coordination with the other network devices 10,11,13,16,18,40,41,42 and the server 17, after the server 17 is already addressed and named within the network 2. The information about the services 52 and virtual services 51 of every network device 10,11,13,16,18,40,41,42 and of the connected devices 17,19 are shared within the network 2. According to FIG. 4 a user may use the information about at least one virtual service 51 of the network device 16 or the connected device 17 on the client terminal 18 for further purposes. For example, the client terminal 18 may provide internal workflows based on detected information about services of other network devices 10,11,13,16,18,40,41,42 or devices 17,19.

Figure 5:
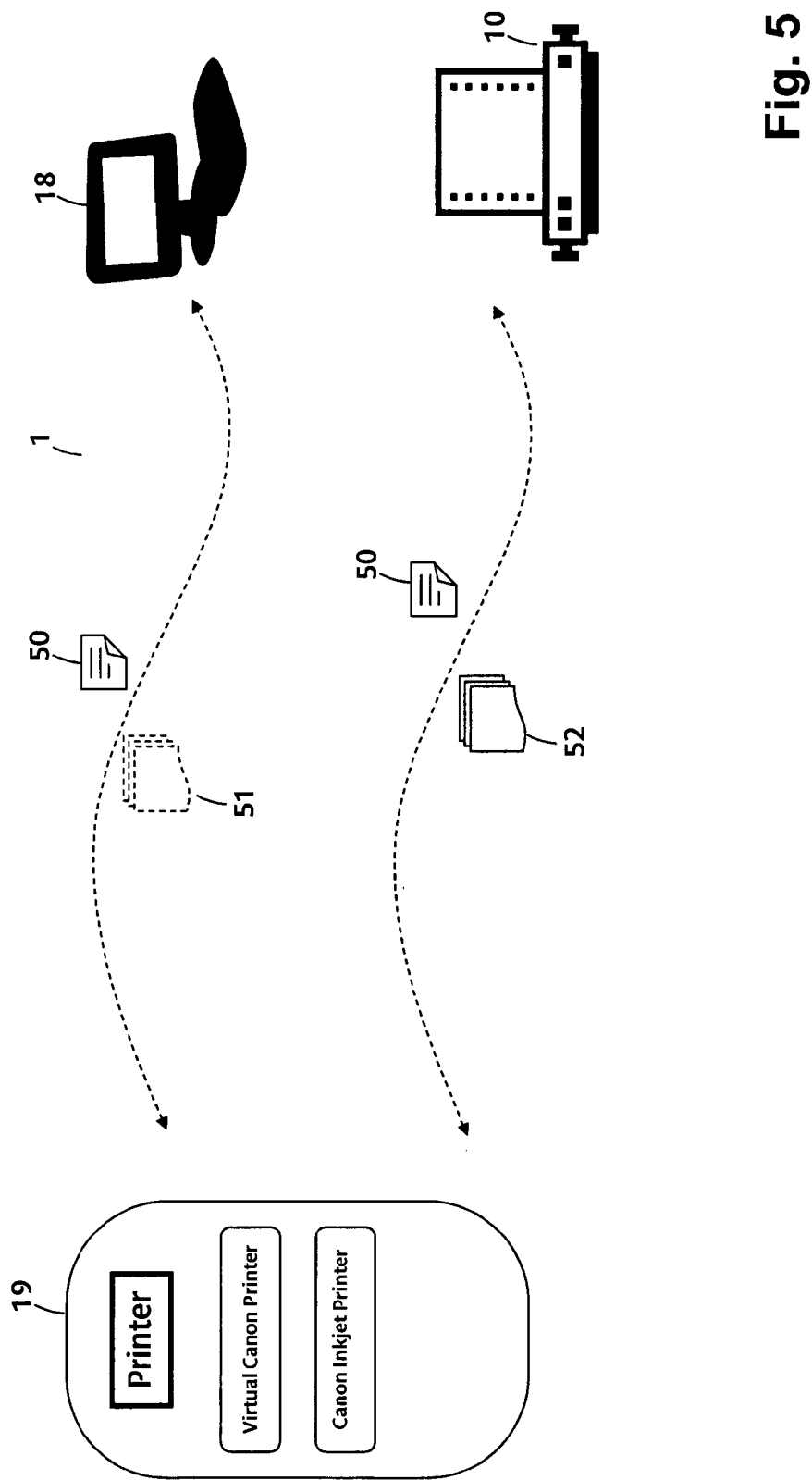
FIG. 5 is a figure showing a mobile device receiving information about a virtual service of a wireless connected device and receiving information about a printer service of a wireless connected printer.

The embodiment of FIG. 5. discloses a mobile device 19 as a connectable device and a printer 10 and a computer terminal 18 as network devices of the system 1. The mobile device 19 is addressed and named in coordination with the network devices 10,18 within the system 1 and after establishing a network connection receives the information o the services 52 of the printer 10 and the information of the virtual services 51 of the client terminal 18. The client terminal 18 response the information of the virtual services 51 based on the device service discovery request of the mobile device 19. According to the embodiment of FIG. 5, the printer respond information about printer services 52 and the client terminal respond information about a virtual printer services 51 to the mobile device 19. Based on internal workflows of the operating system of the mobile device 19, every detected printer 10,18 is listed within a pre-defined printer list and is selectable by a user by pressing a related button on the mobile device 19. If a user may select the virtual printer, a print job may be forwarded to the client terminal 18, which emulates a printer 10. The print job may be processed on the client terminal 18 and also further feedbacks and notifications may be sent by the client terminal 18 to the mobile device 19 emulating a virtual printer. For example, the client terminal 18 may acknowledge to the mobile device 19 the receiving of a print job from to mobile device 19.

Figure 6:
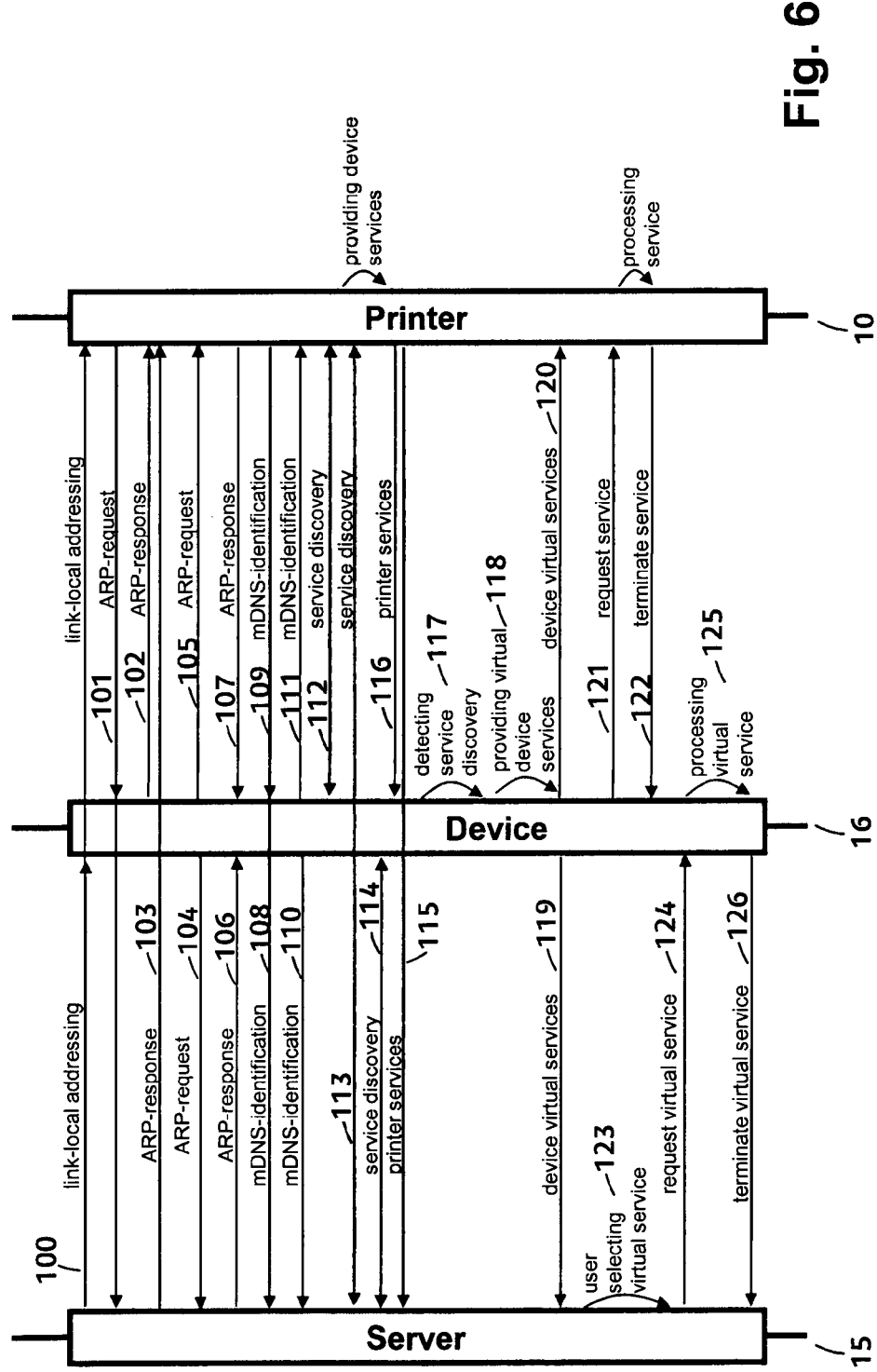
FIG. 6 is a Unified Modelling Language (UML) diagram showing one server as a network device and two devices, which may be connected to the network via the server.

FIG. 6 is a Unified Modelling Language (UML) diagram showing one server 15 as a network device and two devices 10,16, which may be connected to the network 2 (not shown in FIG. 6) via the server 15. According to the embodiment of FIG. 6, the server 15 as a network device provides a link-local addressing service 100 to the printer 10 and the device 16. It would be appreciated if the Bonjour service of Apple Inc. may be used for the addressing, naming and device service discovery procedure. However, also other addressing, naming and device service discovery request may be used for the present invention. Based on the link-local addressing notification 100, the printer 10 and the device 16 negotiate based on Address Resolution Protocol (ARP) request and responses 101,102,103,104,105,106,107 unique addresses within the network 2. Additionally, based on the negotiated addresses the printer 10 and the device 16 are negotiating with the server 15 about appropriate names within the network 2 by using mDNS queries and mDN- SResponder daemons 108,109,110,111. After the printer 10 and device 16 are established by their address and name within the network 2, device service discovery requests 112,113,114 conduct and share the information about the printer services 115,116 between the network device 15 and the devices 10,16. On the device 16 the relevant device service discovery requests 112,114 start a workflow for analysing 117 the device service discovery requests 112,114 and for providing predefined information about virtual services 51 (not shown in FIG. 6) on the device 16. The information about the virtual services 51 are shared 119,120 between the network device 15 and the devices 10,116 of the network 2. According to the embodiment of FIG. 6 the device 16 uses the information of the printer services for requesting 121 a printer 10 related services, such as printing out a document of the device 16 on the printer 10. After the printer service is terminated on the printer 10, a notification 122 about the terminated printer service is routed to the device 16.

Additionally, a user may select 123 at least one of the virtual services of the device 16 and requesting 124 the virtual service. The request 124 is processed on the device 125 by for example emulating the requested service on the device 16. For example the responding of a medical device or another printer may be emulated on the device 16 as a virtual service. After the virtual service is terminated on the device 16, a notification 126 about the termination of the virtual service on the device 16 is sent to the server 15.

The invention claimed is:

1. A system comprising a network including at least one device having at least one actual software-based or hardware-based service and one mobile device, at least one of the mobile device and the device having device detection and device service detection functionalities, the system comprising:
    one or more computer-readable media storing
        a code portion adapted to address the device within the network,
        a code portion adapted to name the device within the network based on the addressing of the device within the network,
        a code portion adapted to discover services on the device, and
        a code portion adapted to analyse a service discovery request received at the device and respond with information about a virtual printer service on the device and to not respond with information about the at least one actual software-based or hardware-based service of the device,
    wherein a functionality on the mobile device is linked to the virtual printer service on the device so that based on internal workflows of an operating system of the mobile device every detected printer on the network is listed within a predefined printer list and is selectable by a user, including a virtual printer representing the virtual printer service on the device; and
    one or more processors that are coupled to the one or more computer-readable media and that are configured to implement the code portions.

2. A system as claimed in claim 1, wherein at least two network devices within the network share the information about the virtual printer service on the device.

3. A system as claimed in claim 1, wherein the mobile device accesses the virtual printer service on the device based on the information of the virtual printer service.

4. A system as claimed in claim 1, wherein the virtual printer service on the device is a predefined service, which may be emulated or simulated on the device and/or by the device, and the information of the virtual printer service is stored on the device.

5. A system as claimed in claim 1, wherein the code portion adapted to address the device within the network includes a Dynamic Host Configuration Protocol (DHCP) server, which provides a unique IP-address to the device.

6. A system as claimed in claim 1, wherein the code portion adapted to name the device within the network includes a Domain Name System (DNS) server, which provides DNS-format queries for the device.

7. A system as claimed in claim 1, wherein the code portion adapted to address the device within the network includes a link-local addressing, conducted on the device by interacting with multiple network devices within the network.

8. A system as claimed in claim 7, wherein the code portion adapted to name the device within the network includes Multicast DNS (mDNS), conducted on the device by interacting with multiple network devices within the network.

9. A system as claimed in claim 7, wherein the code portion adapted to analyse the service discovery request analyses a mDNS query for the name of the device, conducted on the device.

10. A system as claimed in claim 9, wherein the mDNS query for the name of the device indicates the virtual printer service on the device.

11. A system as claimed in claim 1, wherein a communication transport protocol between the device and at least one of the network devices is the Hypertext Transfer Protocol (HTTP) connection or the User Datagram Protocol (UDP).

12. A method for connecting a device to a network, the network having at least one mobile device and the device having at least one actual software-based or hardware-based service, and at least one of the mobile device and the device having device detection and device service detection functionalities, the method comprising:
    addressing the device within the network;
    naming the device within the network based on the addressing of the device within the network;
    discovering services on the device;
    analysing a service discovery request received at the device and responding with information about a virtual printer service on the device and not responding with information about the at least one actual software-based or hardware-based service of the device; and
    linking a function on the mobile device to the virtual printer service by listing, based on internal workflows of an operating system of the mobile device, every detected printer on the network within a predefined printer list such that each printer is selectable by a user, including a virtual printer representing the virtual printer service on the device.

13. One or more non-transitory storage media storing a program for connecting to a network, which when executed on a device having at least one actual software-based or hardware-based service and on a mobile device, causes the device and the mobile device to perform a method, the method comprising:
    addressing the device within the network;
    naming the device within the network based on the addressing of the device within the network;
    discovering services on the device;

analysing a service discovery request received at the device and responding with information about a virtual printing service and not responding with information about the at least one actual software-based or hardware-based service of the device; and linking a function on the mobile device to the virtual printer service by listing, based on internal workflows of an operating system of the mobile device, every detected printer on the network within a predefined printer list such that each printer is selectable by a user, including a virtual printer representing the virtual printer service on the device.

\* \* \* \* \*